(12) United States Patent
DeGrazia

(10) Patent No.: US 7,822,050 B2
(45) Date of Patent: Oct. 26, 2010

(54) BUFFERING, PAUSING AND CONDENSING A LIVE PHONE CALL

(75) Inventor: Bradley Richard DeGrazia, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 843 days.

(21) Appl. No.: 11/621,510

(22) Filed: Jan. 9, 2007

(65) Prior Publication Data

US 2008/0165791 A1    Jul. 10, 2008

(51) Int. Cl.
  *H04L 12/56* (2006.01)
(52) U.S. Cl. ............... 370/412; 379/67.1; 704/270; 704/207
(58) Field of Classification Search .............. None
  See application file for complete search history.

(56) References Cited

U.S. PATENT DOCUMENTS

| | | | | |
|---|---|---|---|---|
| 6,049,765 A | * | 4/2000 | Iyengar et al. ............. | 704/201 |
| 2001/0051874 A1 | * | 12/2001 | Tsuji ......................... | 704/270 |
| 2002/0038209 A1 | * | 3/2002 | Brandel et al. ............. | 704/207 |
| 2002/0176546 A1 | * | 11/2002 | Dietz et al. ................ | 379/67.1 |
| 2004/0057562 A1 | * | 3/2004 | Myers et al. ............. | 379/88.14 |
| 2006/0190809 A1 | * | 8/2006 | Hejna ..................... | 715/500.1 |

OTHER PUBLICATIONS

Bernsee, Dirac—Free Commercial Grade Cross-Platform Audio Time and Pitch Manipulation Library v1.21, User Manual, May 2005, pp. 1-19.

* cited by examiner

*Primary Examiner*—Jayanti K Patel
*Assistant Examiner*—Anthony Sol
(74) *Attorney, Agent, or Firm*—Stolowitz Ford Cowger LLP

(57) ABSTRACT

In one embodiment, a telephone locally buffers and then processes received voice data to resolve communication impediments and for other reasons. The locally buffered voice data can be, for example, tonally adjusted to accommodate a hearing deficiency of a listener, translated, transcribed, and automatically or manually slowed down to improve comprehension and for other reasons. As a result of the buffering occurring locally on the telephone, voice data originating from voicemail systems and voice menu systems may be played back for improved comprehension independently of the buffering capabilities provided by those systems.

18 Claims, 3 Drawing Sheets

BUFFERING, PAUSING AND CONDENSING A LIVE PHONE CALL

TECHNICAL FIELD

The present disclosure relates generally to the field of networking.

BACKGROUND

Telephones facilitate a real-time conversation between two or more persons. Recently, telephones such as cell phones have been supplemented with ancillary features that provide added functionality. For example, telephones keep track of time, act as alarm clocks, provide radio or television service, provide stock quotes or weather information, play songs, etc.

While these secondary functions allow telephones to replace other devices, these improvements do not improve the primary function of telephones. That is, these improvements do not address communication impediments that can interfere with comprehension of a conversation. Communication impediments such as language barriers, hearing deficiencies, speech impediments and the like can make comprehension of a telephone conversation between two or more persons difficult or impossible. When a call participant has difficulty understanding a speaker, the participant is limited to turning the volume up or down, or asking the speaker to adjust his speech by slowing down, speeding up, speaking more clearly, etc. These options are inconvenient and often do not improve comprehensibility. The disclosure that follows solves these and other problems.

DESCRIPTION OF EXAMPLE EMBODIMENTS

Overview

Figure 1:
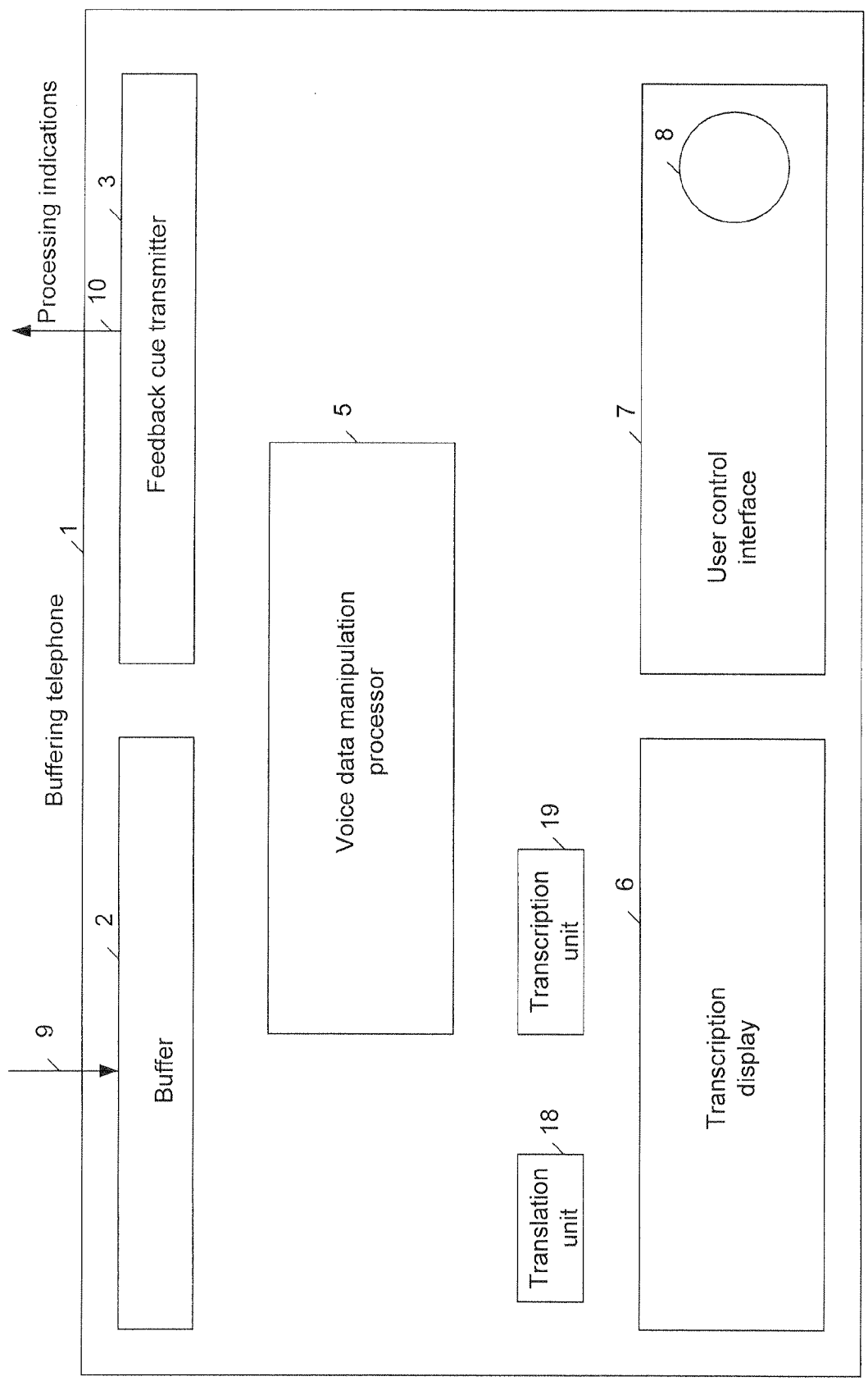
FIG. 1 illustrates an example buffering telephone for improving comprehensibility of a live conversation.

In one embodiment, a telephone locally buffers and then processes received voice data to resolve communication impediments and for other reasons. The locally buffered voice data can be, for example, tonally adjusted to accommodate a hearing deficiency of a listener, translated, transcribed, and automatically or manually slowed down to improve comprehension and for other reasons. As a result of the buffering occurring locally on the telephone, voice data originating from voicemail systems and voice menu systems may be played back for improved comprehension independently of the buffering capabilities provided by those systems.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example buffering telephone for improving comprehensibility of a live conversation.

Referring to FIG. 1, the example buffering telephone 1 includes a buffer 2, a feedback cue transmitter 3, a voice data manipulation processor 5, a transcription display 6, a translation unit 18, a transcription unit 19, and a user control interface 7. The telephone 1 receives voice data 9 over a network and originating from one or more remote endpoints such as a conference phone, a cell phone, a Plain Old Telephone System (POTS) phone or a Voice over Internet Protocol (VoIP) phone. Voice data 9 received by the telephone 1 is stored in the buffer 2 and manipulated by the voice data manipulation processor 5 according to commands received over the interface 7.

The processor 5 is configured to pause audio play out of a live telephone conversation, and then replay a non-live portion of the conversation stored in the buffer 2. In addition to replaying buffered portions, the processor 5 is configured to skip between any previous buffered portions. The processor 5 is also configured to allow fast forwarding through previously buffered portions, which is play out of the buffered conversation at an increased speed.

The processor 5 is also configured for audio play out using altered speeds, pitches, and tones. These adjustments generally are used to allow for increased comprehension by a user of the telephone 1. For example, the processor 5 in the present example may be configured to automatically detect speech expressing numbers, and then slow down the detected speech by a predetermined percentage such as ten percent. For example, when a person spends ten seconds of speech to express a credit card number, the processor 5 may auto-detect and play out that speech over eleven seconds, making it easier for a user to comprehend the number. The processor 5 can pitch adjust the slowed down speech to make the slowed down speech pitch perfect. Other examples of altering speed, adjusting pitch and tone are explained later in greater detail later by way of example scenarios explained later.

The buffering and processing of the voice data 9 occur locally at the telephone 1 using the buffer 2 and the processor 5. In other words, the buffering and processing performed by the telephone 1 are distinct from other systems that may use buffering at switches or service provider computers that facilitate voicemail services or conferencing services. As opposed to other systems, the telephone 1 buffers independently of any intermediary devices facilitating the phone call and independently of the remote endpoint such that the telephone 1 is not dependant on a service provider to offer such functionality. This localized buffering is particularly advantageous when the buffering and processing are used to assist a person with a hearing deficiency in comprehending telephone prompts originating from a system that does not accommodate for the hearing deficiencies. Moreover, the locally buffered voice data may be stored beyond the length of the call so that a user can access and listen to telephone prompts or other information well after the connection with the telephone prompting system has been terminated.

Figure 2:
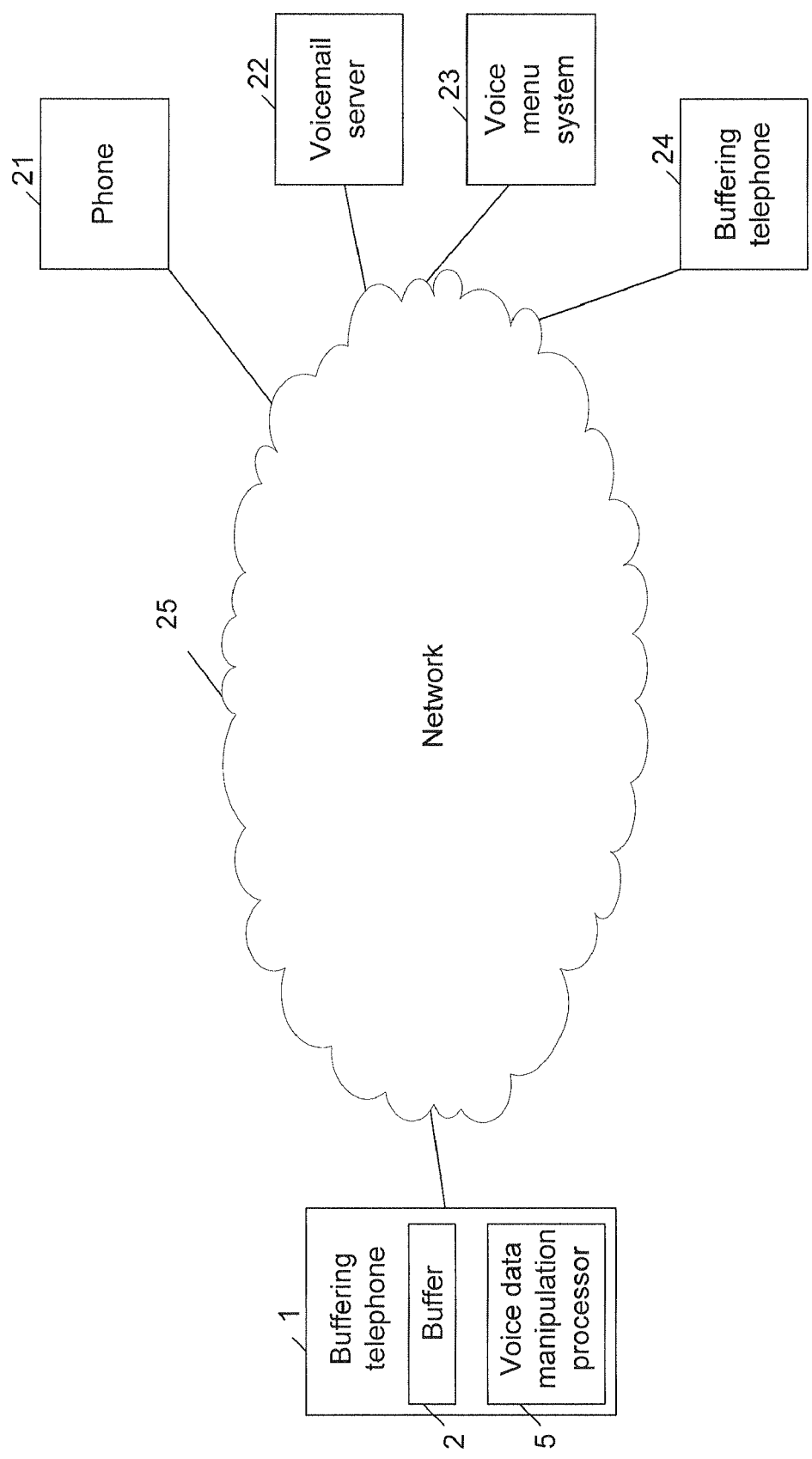
FIG. 2 illustrates a system for using the buffering telephone illustrated in FIG. 1.

Referring to FIG. 2, for example, the telephone 1 can buffer voice data originating from a non-buffering phone 21, voicemail server 22, or voice menu system 23 and the like regardless of the buffering capabilities of those remote computers and systems. The telephone 1 can also locally buffer voice data originating from a buffering device such as buffering telephone 24. The telephone 1 provides for retrieval of locally buffered voice data independently of the buffering capabilities of an intervening network 25. The buffering telephone 1 can buffer any voice data whether it is received over a circuit switched network, a packet switched network or a wireless network.

Referring again to FIG. 1, the feedback cue transmitter 3 is signaled by the processor 5 to send indications 10 from the buffering telephone 1 to the remote endpoint. These indications 10 can be used to notify the remote endpoint when the telephone 1 is not currently playing out the live conversation. In other words, the indications 10 may be sent to alert the remote endpoint that the user is not currently listening to the live conversation.

The transcription display 6 is a visual display showing a text conversion of the live conversation. The received voice data 9 is converted into text by the processor 5 and the transcription unit 19 for displaying on the display 6. The display 6 can show the text of the live conversation even when a user is currently listening to buffered conversation. This feature allows the user to comprehend the live conversation even when the user is also listening to only prior buffered portions of the conversation. Other combinations are possible, for example, buffered conversation can be displayed in text while the live conversation is being played out in audio.

In other embodiments, the buffering telephone 1 and the transcription unit 19 can be configured for only causing selected portions of speech to be automatically transcribed and displayed in the display 6. For example, the telephone 1 can be configured to monitor the input 9 for speech representing seven or ten digits in sequence, which is highly likely to correspond to a telephone number. These digits can then be displayed in the display 6, which is helpful since empirical studies show that telephone numbers are some of the most typical portions of speech that can be miscomprehended. Other types of speech empirically shown to be difficult to understand may be automatically monitored for and displayed in the display 6, e.g. dates, times, addresses, credit card numbers, bank routing numbers, email addresses, websites addresses, etc.

The translation unit 18 is configured to translate the received voice data 9 from a first language for audio play out according to a second language. The translation unit 18 communicates with the transcription unit 19 so that text may be displayed in any language.

The interface 7 includes any switches, dials, buttons, etc. necessary for the user to make requests to the telephone 1. For example, the interface 7 may include a rewind button, a fast forward button, a play button and a pause and resume button. Additionally, in the present example the interface 7 includes an input 8 for requesting slowed-down audio play out. The input 8 is configured to request slowed-down play out of currently played out audio. Preferably, the input 8 is activated by a single touch so that the user can quickly activate the input 8 without removing a telephone headset from their ear. The requested slow-down is made according to a predetermined rate or ratio. For example, activating the input 8 may cause the played-out conversation to slow down to ninety percent of a current playback rate. Slow-down can be advantageous when a remote speaker is speaking too quickly and unclearly, and for other reasons. Although the slow down described above uses on/off type digital increments, other configurations can be used such as analog increments, e.g. a slow-down dial.

Several example scenarios follow to illustrate the functionality of the telephone 1 by way of example. These examples illustrate applications of how the telephone 1 can be used to increases comprehensibility of a conversation as well as providing other benefits.

In one example scenario, person A, a user of the telephone 1 begins listening to a live conference call in which person B, a speaker at a remote endpoint, is talking. During the live conversation, person A hears a portion of person B's speech that she needs to have repeated for note taking or some other reason. Person A issues a pause command via the interface 7, which causes the processor 5 to halt audio play out person B's live speech while continuing to buffer voice data 9.

While the live conversation is no longer being played out by the telephone 1, person A may request any one of many operations according to her preference. For example, person A may request that a non-live portion of the conversation be replayed over and over to assist her in understanding a previous portion of person B's speech. Alternatively, person A may do something else entirely, such as addressing an interruption caused by someone walking into her conference room.

Meanwhile, person B continues to produce live speech which is being recorded on the buffer 2 and which is not being played out to person A. At any time, person B could ask person A a question, which she will not hear because she directed the telephone 1 to pause play out of the live conversation. To prevent confusion and for numerous other reasons, the processor 5 may be configured to perform any one of several operations.

One operation the processor 5 may perform is to convert the live speech by person B into text. The processor 5 then sends the text of the live speech to the transcription display 6 to be displayed in real-time. In other words, while person A is busy with an audio replaying of a non-live segment of person B's speech, the processor 5 and the transcription display 6 are configured to display person B's live speech. Accordingly, person A or another participant at her endpoint is able to follow along with the live conversation while at the same time listening to a non-live, buffered speech segment.

The processor 5 may also generate a feedback signal indicating to one or more of the other participating remote endpoints that live speech is no longer being played out by the telephone 1. The feedback signal is then transferred to the feedback cue transmitter 3 for transmission to one or more of the other endpoints as processing indications 10. The processing indications 10 may involve any form such as tones or a signal that triggers a visual display on one of the remote endpoints. When this feedback signal is used, particularly when the feedback signal causes an audio cue to play out at the remote endpoint, the feedback signal is preferably transmitted only when the received data 9 represents silence or some other conversational lull, which prevents the feedback signal from interrupting speaking by the remote caller.

After the live conversation has been paused for some amount of time (such as X seconds) person A sends a resume request using the interface 7. Since the live conversation was paused for X seconds, resumed play out of the conversation is X seconds behind the live conversation. To allow person A to "catch up" to the live conversation without missing any information conveyed by the buffered portion, the processor 5 may perform one of many operations.

One operation the processor 5 may perform to allow catch up is to compress or remove silence periods occurring in the buffered portion. The processor 5 may be configured to detect three different types of silence, each of which may be treated differently. In the present example, the processor greatly compresses play out of pauses occurring between adjacent sentences in person B's speech, while only slightly compressing play out of pauses occurring between adjacent words in person B's speech. Other pauses that are neither pauses between adjacent sentences and words are skipped during play out. These other pauses may represent conversational lulls, etc.

Another operation the processor 5 may perform to allow catch up is to increase the playback speed of the buffered speech. The processor 5 is configured to manipulate the speech to increase playback speed while keeping pitch constant. Pitch is the perceived frequency of the speech which depends not only on the actual frequency of the speech but other factors such as sound pressure and wave form corresponding to the speech. Thus, pitch remains constant while actual frequency, wave form and sound pressure may vary. As a result, the playback of person B's buffered speech occurs at his normal pitch even though play out is sped up.

The processor 5 may also allow catch up simply by processing a jump to end of buffer command. In other words, the interface 7 may include an input usable to request immediate skipping of buffered playback so that live play out is immediately resumed.

In another example scenario, a user of the telephone 1, person C, is conducting a conversation with a user of a POTS telephone, person D. In this scenario, person C has a tonal hearing deficiency. In addition, person C has other hearing deficiencies that make understanding normal-speed speech difficult.

The telephone 1 is preconfigured with the hearing deficiency information of person C. As the voice data 9 is received, the processor 5 analyzes the voice data 9 to detect whether the undesired tone is included. When the undesired tone is included, the processor 5 screens the undesired tone from play out and may replace the undesired tone with a preferred tone. This may include, for example, converting a tone that is characteristic of a male speaker into a tone that is characteristic of a female speaker.

The processor 5 also plays out the buffered voice data at a reduced speed. For example, the speech may be played out at a speed of ninety percent of the original speed. Or alternatively, the processor 5 may slow down speech dynamically by compressing silence and other conversational lulls and then extending a time period for playing speech periods. As a result, the speech periods are slowed down and the person C still hears a live conversation as it occurs. Thus, person C can comprehend the speech without asking person D to slow down and without falling behind.

In addition to the above, the processor 5 and the transcription unit 19 display the speech as text on the transcription display 6. This also allows for better comprehension by person C. The text in this example is displayed at the same rate the audio is played out.

When the person C is still having difficulty comprehending, person C may use the input 8 on the interface 7 to manually request play out of the voice data 9 to be additionally slowed down by the predetermined rate. When silence compression is insufficient to keep person C listening to the speech in real time, the processor 5 may cause transmission of warble tones or some other indication by the transmitter 3. The warbles may be transmitted only when person D stops speaking, so as to avoid interrupting person D. Person D receives the warbles as an indication that person C is still trying to catch up and cannot immediately respond to questions.

In another example scenario, the person C with the hearing deficiencies has established a call with an automated menu that voices movie show times. The processor 5 receives the voice data 9 and adjusts the pitch and tone to accommodate the hearing deficiencies of person C.

The person C may also replay a certain movie selections. These movie selections can be replayed locally at the telephone 1 using the buffer. Accordingly, person C does not have to memorize or physically record the recited numeric selections required to cause a server to replay the automated menus. The person C does not need these numeric selections as the replaying is occurring using locally accessible information instead of data stored at the server.

In another example scenario, person E, who speaks a first language, uses the telephone 1 to converse with person F, who speaks a second, different language. The processor 5 and the translation unit 18 convert and play out the speech in the first language for person E.

The telephone 1 may also convert person E's speech into the second language before transmitting to person F. Accordingly, person F receives the speech in the second language through his POTS phone.

Figure 3:
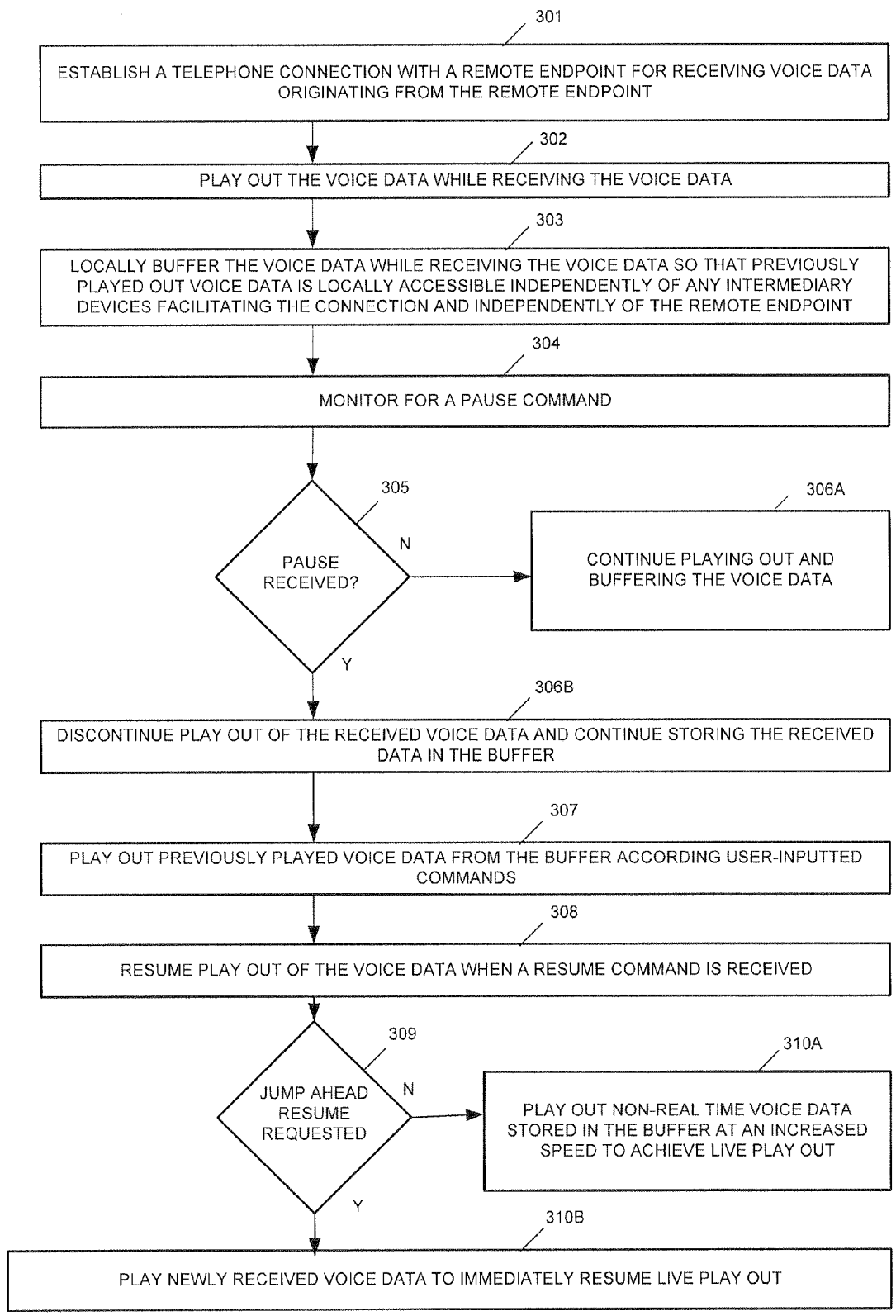
FIG. 3 illustrates an example method for using the buffering telephone illustrated in FIG. 1.

FIG. 3 illustrates an example method for using the buffering telephone illustrated in FIG. 1.

In block 301, the telephone 1 establishes a connection with a remote endpoint for receiving voice data. The telephone 1 plays out the voice data while receiving the voice data in block 302. In block 303, the telephone 1 locally buffers the received voice data. The local buffering allows previously played out voice data to be locally accessible and re-playable independently of any intermediary devices facilitating the connection and independently of the remote endpoint.

The telephone 1 monitors for a pause command in block 304. If no pause command is detected in block 305, the telephone 1 continues play out and buffering in block 306A.

When the pause command is detected in block 305, the telephone 1 discontinues play out of the received voice data but continues buffering the received voice data in block 306B. The telephone 1 then plays out previously played voice data from the buffer according to user-inputted commands in block 307.

In block 308, the telephone 1 resumes play out when the resume command is received. Play out may resume with live conversation or non-live conversation. The telephone 1 determines whether a jump to end of buffer command is received in block 309. When no jump-ahead command is received, in block 310A the telephone 1 plays out non-real time voice data read from the buffer at an increased speed to eliminate a delay and achieve live play out. In block 310B, the telephone 1 plays newly received voice data immediately when the jump-ahead command is received.

The above examples are described with respect to a telephone establishing a call. In other examples, the methods described above may be used to establish a call from any endpoint such as a personal computer, an IP phone, a Personal Digital Assistant (PDA), a cell phone, a smart phone, etc.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
   a processing device; and
   a memory coupled to the processing device comprising instructions executable by the processing device, the processing device operable when executing the instructions to:
   establish a connection with a remote telephone endpoint, the connection for exchanging a live conversation;
   buffer a stream of voice data received over the established connection, the stream originating from the remote telephone endpoint and representing at least a portion of the live conversation; and
   selectively alternate between playing out one or more portions of the received stream of voice data in real-time and playing out one or more portions of the buffered stream of voice data in non-real-time according to inputted commands;
   wherein the processing device is further operable to send a processing indication to the remote telephone endpoint when the stream of buffered voice data is played in non-real-time, the processing indication signaling that real-time play out of the stream of voice data has been halted.

2. The apparatus of claim 1, wherein the processing device is further operable to locally buffer the stream of voice data independently of any buffering resources located on intermediary devices facilitating the connection and independently of any buffering resources located on the remote telephone endpoint.

3. The apparatus of claim 1, wherein the processing device is configured to send the processing indication during periods of silence.

4. The apparatus of claim 1, wherein the processing device is further operable to:
   play out a selected portion of the buffered stream of voice data that corresponds to a previously played portion of the stream of received voice data such that a delay develops in the conversation;
   play out a remaining portion of the stream of buffered voice data at an accelerated rate to eliminate the delay caused by the play out of the selected portion of the buffered stream of voice data; and
   play out the stream of voice data at a received rate after the delay is eliminated.

5. The apparatus of claim 1, wherein the processing device is further operable to replace a non-preferred tone included in the buffered stream with an alternate tone before playing out the buffered stream.

6. A method, comprising:
   establishing a connection with a remote endpoint;
   playing out a first portion of a stream of voice data corresponding to a live conversation and originating from the remote endpoint, the play out of the first portion occurring in real-time;
   storing the first portion in a buffer during play out;
   pausing play out of the first portion such that play out of a second portion of the stream of voice data is delayed, the pausing occurring in response to a received pause command;
   playing out the first portion from the buffer after pausing play out to repeat a speech segment of the first portion;
   storing the second portion in the buffer while playing out the buffered first portion;
   processing the stored second portion to generate a manipulated representation of the stored second portion, wherein the processing includes identifying speech segments and non-speech segments in the stored second portion and relatively compressing or removing at least one of the non-speech segments to generate the manipulated representation;
   wherein the manipulated representation, if played out, has a shorter total play time than the stored second portion, if played out;
   in response to receiving a resume command, playing out the manipulated representation of the stored second portion to catch up to real-time play out; and
   sending a processing indication to the remote endpoint while playing out the manipulated representation of the second portion from the buffer until real-time play out is achieved.

7. The method of claim 6, further comprising playing out a slowed down representation of the buffered first portion, the slowed down representation of the buffered first portion having a total play time that is greater than a total play time of the real-time play out of the first portion.

8. The method of claim 6, further comprising:
   analyzing the stream of voice data to identify voiced numerals;
   automatically slowing play out of the buffered first portion to correspond with the voiced numerals; and
   automatically restoring play out speed after play out of the voiced numerals is complete.

9. The method of claim 8, further comprising pitch correcting the slowed play out of the voiced numerals to keep pitch constant between slow play out of the voiced numerals and remaining play out of the buffered first portion.

10. The method of claim 6, further comprising:
   analyzing the received stream of voice data to identify voiced numerals;
   automatically transcribing only the identified voiced numerals without automatically transcribing unidentified portions of the received stream of voice data; and
   automatically displaying the transcribed numerals in a display.

11. The method of claim 6, further comprising:
transcribing the second portion while playing out the buffered first portion; and
displaying the transcribed second portion in real-time while playing out the buffered first portion so that the displayed second portion represents a different segment of speech than the played out buffered first portion.

12. The method of claim 6, wherein the processing includes:
identifying a natural pause in the stored second portion, wherein the natural pause occurs between adjacent sentences of speech of the stored second portion or between adjacent words of the speech of the stored second portion; and
relatively compressing the identified pause to generate the manipulated representation.

13. The method of claim 6, wherein the processing includes speeding up a play out speed of the stored second portion to generate the manipulated representation.

14. The method of claim 13, further comprising adjusting properties of speech of the stored second portion in conjunction with the speed up to normalize pitch in the manipulated representation.

15. An apparatus, comprising:
a processing device; and
a memory coupled to the processing device comprising instructions executable by the processing device, the processing device operable when executing the instructions to:
receive a stream of voice data comprising a first portion and a second subsequent portion, wherein the stream of voice data corresponds to a live conversation;
play out the first portion in real-time;
temporarily suspend real-time play out in response to a request;
process the second portion to generate a manipulated representation of the second portion, wherein the processing includes identifying speech segments and non-speech segments in the second portion and relatively compressing or removing at least one of the non-speech segments to generate the manipulated representation;
wherein the manipulated representation, if played out, has a shorter total play time than the second portion, if played out; and
play out the manipulated representation of the second portion to return play out to real-time;
wherein the processing device is further operable to send a processing indication to a remote telephone endpoint to signal that real-time play out of the stream of voice data has been temporarily suspended.

16. The apparatus of claim 15, wherein the processing device is further operable to:
identify a natural pause in the second portion, wherein the natural pause occurs between adjacent sentences of speech of the second portion or between adjacent words of the speech of the second portion; and
relatively compress the identified pause to generate the manipulated representation.

17. The apparatus of claim 15, wherein the processing includes speeding up a play out speed of the second portion to generate the manipulated representation.

18. The apparatus of claim 17, wherein the processing device is further operable to adjust properties of speech of the second portion in conjunction with the speed up to normalize pitch in the manipulated representation.

* * * * *